(12) United States Patent
Kikutani et al.

(10) Patent No.: US 10,760,183 B2
(45) Date of Patent: Sep. 1, 2020

(54) BIODEGRADABLE ALIPHATIC POLYESTER FIBER AND METHOD FOR PRODUCING THE SAME

(71) Applicants: TOKYO INSTITUTE OF TECHNOLOGY, Meguro-ku (JP); KANEKA CORPORATION, Osaka-shi (JP)

(72) Inventors: Takeshi Kikutani, Meguro-ku (JP); Wataru Takarada, Meguro-ku (JP); Noriyuki Suzuki, Settsu (JP); Sarah Siti, Settsu (JP); Ryuji Fukuda, Settsu (JP)

(73) Assignees: TOKYO INSTITUTE OF TECHNOLOGY, Meguro-ku (JP); KANEKA CORPORATION, Osaka-shi (JP)

( * ) Notice: Subject to any disclaimer, the term of this patent is extended or adjusted under 35 U.S.C. 154(b) by 24 days.

(21) Appl. No.: 16/069,408

(22) PCT Filed: Jan. 11, 2017

(86) PCT No.: PCT/JP2017/000633
§ 371 (c)(1),
(2) Date: Jul. 11, 2018

(87) PCT Pub. No.: WO2017/122679
PCT Pub. Date: Jul. 20, 2017

(65) Prior Publication Data
US 2019/0003082 A1    Jan. 3, 2019

(30) Foreign Application Priority Data

Jan. 12, 2016   (JP) ................. 2016-003715

(51) Int. Cl.
| | |
|---|---|
| *D01F 1/02* | (2006.01) |
| *D01F 6/62* | (2006.01) |
| *D04H 3/011* | (2012.01) |
| *D01F 1/10* | (2006.01) |
| *C08K 5/20* | (2006.01) |
| *C08K 5/053* | (2006.01) |
| *D01D 5/16* | (2006.01) |
| *D01F 6/92* | (2006.01) |
| *C08G 63/06* | (2006.01) |
| *D01F 6/84* | (2006.01) |
| *C08K 5/00* | (2006.01) |

(52) U.S. Cl.
CPC ............... *D01F 1/02* (2013.01); *C08G 63/06* (2013.01); *C08K 5/053* (2013.01); *C08K 5/20* (2013.01); *D01D 5/16* (2013.01); *D01F 1/10* (2013.01); *D01F 6/62* (2013.01); *D01F 6/625* (2013.01); *D01F 6/84* (2013.01); *D01F 6/92* (2013.01); *D04H 3/011* (2013.01); *C08K 5/0083* (2013.01); *D10B 2331/04* (2013.01); *D10B 2401/12* (2013.01)

(58) Field of Classification Search
CPC ......... D01F 1/02; D01F 6/62; D01B 2331/04; D01B 2401/12; D04H 3/011
See application file for complete search history.

(56) References Cited

U.S. PATENT DOCUMENTS

| | | | |
|---|---|---|---|
| 2003/0088052 A1 | 5/2003 | Yamane | |
| 2015/0210801 A1 | 7/2015 | Abe et al. | |
| 2015/0291771 A1* | 10/2015 | Suzuki | C08L 101/16 |
| | | | 524/230 |
| 2016/0230313 A1 | 8/2016 | Kikutani et al. | |

FOREIGN PATENT DOCUMENTS

| | | |
|---|---|---|
| JP | 10-37020 A | 2/1998 |
| JP | 11-61561 A | 3/1999 |
| JP | 11-286864 A | 10/1999 |
| JP | 2002-371431 A | 12/2002 |
| JP | 2008-14098 A | 1/2008 |
| WO | WO 2014/020838 A1 | 2/2014 |
| WO | WO 2014/068943 A1 | 5/2014 |
| WO | WO 2015/029316 A1 | 3/2015 |

OTHER PUBLICATIONS

International Search Report dated Apr. 18, 2017 in PCT/JP2017/000633 filed Jan. 11, 2017.

* cited by examiner

*Primary Examiner* — Robert D Harlan
(74) *Attorney, Agent, or Firm* — Oblon, McClelland, Maier & Neustadt, L.L.P.

(57) ABSTRACT

An objective is to improve the spinnability and the productivity and increase the tensile strength of a polyester fiber containing polyhydroxyalkanoate. Disclosed is a biodegradable aliphatic polyester fiber containing a polyhydroxyalkanoate, a nucleating agent, and a lubricant, wherein the nucleating agent contains pentaerythritol, and the lubricant contains at least one of behenic amide, stearic acid amide, erucamide, oleic amide, and a combination thereof.

12 Claims, No Drawings

BIODEGRADABLE ALIPHATIC POLYESTER FIBER AND METHOD FOR PRODUCING THE SAME

TECHNICAL FIELD

The present invention relates to a biodegradable aliphatic polyester fiber and a method for producing the same.

BACKGROUND ART

In recent years, there are problems caused by the heavy burden of plastic waste on the global environment, such as harmful effects on the ecosystem, emission generation of harmful gas during combustion, and global warming due to the large amount of heat generated by combustion. Biodegradable plastics have been actively developed as materials that can solve these problems.

Carbon dioxide generated by combustion of biodegradable plastics obtained from raw materials derived from plants is originally present in the air. Therefore, such combustion does not increase the amount of carbon dioxide in the atmosphere. This is referred to as "carbon neutral" and is regarded as important under The Kyoto Protocol that sets targets for reducing carbon dioxide emissions. Therefore, active use of such plant-derived biodegradable plastics is desired.

Recently, from the viewpoint of biodegradability and carbon neutral, aliphatic polyester which are produced by microorganism using plant-derived raw materials as carbon sources have received attention as biodegradable plastics. Particularly, polyhydroxyalkanoate (hereinafter, sometimes referred to as PHA) resins have received such attention. Among PHA resins, poly(3-hydroxybutyrate) homopolymer resins, poly(3-hydroxybutyrate-co-3-hydroxyvalerate) copolymer resins, poly(3-hydroxybutyrate-co-3-hydroxyhexanoate) copolymer resins (hereinafter, sometimes referred to as P3HB3HH), poly(3-hydroxybutyrate-co-4-hydroxybutyrate) copolymer resins, polylactic acid, etc. have received such attention.

However, since PHA has a slow crystallization speed and has a glass transition temperature lower than room temperature (about 0 to 4° C.), it is necessary to lengthen the cooling time for solidification after heating and melting in the molding process, and therefore the productivity is low. Especially, when intending to produce fibers by melt-spinning using PHA, fibers sticking together or fiber adhesion to a roll occur because the resin solidifies slowly, and therefore, it is difficult to produce fibers stably and the resulting fibers are low in quality.

As a means for solving such problems caused by the slow crystallization speed, there has been disclosed a polyester fiber having a specific crystal structure obtained by melt-spinning of a polyester resin containing poly(3-hydroxybutyrate-co-3-hydroxyhexanoate) at a specific take-up speed (see PTL 1). In this method, the increase in molecular orientation associated with the elongation deformation in the spinning line induces an increase in the crystallization speed, and therefore, solidification from crystallization is completed before the fiber reaches the take-up roll which results in the possible winding of the fiber at the take-up role and the improvement in the physical properties of resulting fibers. However, in mass production of fibers using a large winding machine, since the fibers cannot be winded at a high speed soon after starting, the fibers are usually threaded at a low speed of about 100 m/min to 2,000 m/min and the winding speed is increased gradually. When the speed reaches the production speed, winding of the product starts. Meanwhile, an instrument called "suction gun", which sucks fibers pneumatically is used for threading fibers at the start of a production, but the running speed of fibers when sucking with a suction gun is usually as low as about 2,000 to about 4,000 m/min. Although the method disclosed in PTL 1 is excellent in productivity and physical properties of resulting fibers if the spinning at a take-up speed of 1,500 m/min to 7,000 m/min can be realized, this literature fails to disclose how to improve the workability at the start of the production, such as the stage of threading or the stage of increasing the winding speed before reaching at the above-mentioned production condition.

Disclosed as a prior example of a melt-spinning technology of poly(3-hydroxyalkanoate) is a cold stretching method: immediately after P3HB3HH is extruded from an extruder, P3HB3HH is cooled rapidly to its glass transition temperature Tg or less to prevent blocking of P3HB3HH filaments; and then, P3HB3HH is partially crystalized quickly at its glass transition temperature Tg or more (see PTL 2). According to this method, melt-spinning is carried out by subjecting a polymer that hardly crystallizes like P3HB3HH not to crystallization but to its glass state by cooling, and therefore sticking of fibers or adhesion of fibers to a roll does not occur regardless of the slow crystallization speed thereof and it is possible to produce fibers stably. However, for PHA, whose glass transition temperature is lower than room temperature, it is necessary to establish a low temperature environment using a freezer or something alike in order to rapidly cool PHA to its glass transition temperature or less. Therefore, energy consumption is large, and large-scale equipment is required. Thus, problems remain from the viewpoint of practical use.

Further, disclosed as another prior example is a production method of spinning hollow yarn or multilobal yarn of a biodegradable aliphatic polyester at high speed for a limited melt flow rate and spinning temperature (see PTL 3). This production method requires cooling before drawing, therefore it is constrained by facility. Moreover, factors of molecular structure, such as the copolymerization ratio of poly(3-hydroxyalkanoate) significantly affect the crystallizability and spinnability and the strength of the fibers obtained. However, this prior example does not disclose or suggest an appropriate copolymerization ratio.

Furthermore, disclosed as another prior example is a production method of melt-spinning of poly(lactic acid-co-ethylene glycol) at a speed of 4,000 m/min or more (see PTL 4). This method shows a better high-speed spinnability than that of melt-spinning of polylactic acid alone. However, since polylactic acid is easily hydrolyzed, copolymerization with a hydrophilic polyethylene glycol block, would make poly(lactic acid-co-ethylene glycol) more easily to be hydrolyzed. Therefore, it is difficult to control the amount of water absorption.

As another prior example, it is disclosed to blend pentaerythritol as a nucleating agent for the purpose of improving the crystallization of polyhydroxyalkanoate which crystallizes slowly (see PTL 5). This literature discloses processing methods such as injection molding, blow molding, and extrusion forming, but it fails to disclose or suggest about fibers.

CITATION LIST

Patent Literature

PTL 1: WO 2015/029316
PTL 2: JP-A-2002-371431

PTL 3: JP-A-11-061561
PTL 4: JP-A-10-037020
PTL 5: WO 2014/020838

SUMMARY OF INVENTION

Technical Problem

The objective of the present invention is to improve the spinnability and the productivity of a polyester fiber containing polyhydroxyalkanoate and to enhance the fiber tensile strength.

Solution to Problem

The present inventors conducted intensive studies to solve such problems, and found that incorporating a specific nucleating agent and a specific lubricant into polyhydroxyalkanoate promotes the crystallization of the polyhydroxyalkanoate, improves the suction property, improves the spinnability and the productivity at a high take-up speed, and enhances the fiber tensile strength.

In the first aspect, the present invention relates to a biodegradable aliphatic polyester fiber containing a polyhydroxyalkanoate, a nucleating agent, and a lubricant, wherein the nucleating agent contains pentaerythritol, and the lubricant contains at least one selected from the group consisting of behenic amide, stearic acid amide, erucamide, and oleic amide.

Preferably, the present invention relates to the biodegradable aliphatic polyester fiber, wherein a content of the nucleating agent is 0.05 parts by weight or more and 12 parts by weight or less relative to 100 parts by weight of the polyhydroxyalkanoate.

Preferably, the present invention relates to the biodegradable aliphatic polyester fiber, wherein a content of the lubricant is more than 0.5 parts by weight and 10 parts by weight or less relative to 100 parts by weight of the polyhydroxyalkanoate.

Preferably, the present invention relates to the biodegradable aliphatic polyester fiber, wherein the lubricant is erucamide.

Preferably, the present invention relates to the biodegradable aliphatic polyester fiber, wherein the polyhydroxyalkanoate contains a repeating unit represented by the following formula (1):

$$[-CHR-CH_2-CO-O-] \quad (1)$$

wherein R is an alkyl group represented by $C_nH_{2n+1}$ and n is an integer of 1 or more and 15 or less.

Preferably, the present invention relates to the biodegradable aliphatic polyester fiber, wherein the polyhydroxyalkanoate is one or more species selected from poly(3-hydroxybutyric acid), poly(3-hydroxybutyric acid-co-3-hydroxyvaleric acid), poly(3-hydroxybutyric acid-co-3-hydroxyvaleric acid-co-3-hydroxyhexanoic acid), poly(3-hydroxybutyric acid-co-3-hydroxyhexanoic acid), and poly(3-hydroxybutyric acid-co-4-hydroxybutyric acid).

Preferably, the present invention relates to the biodegradable aliphatic polyester fiber, wherein the polyhydroxyalkanoate is poly(3-hydroxybutyric acid-co-3-hydroxyhexanoic acid).

Preferably, the present invention relates to the biodegradable aliphatic polyester fiber, wherein a monomer percentage of 3-hydroxybutyric acid in the poly(3-hydroxybutyric acid-co-3-hydroxyhexanoic acid) is 99.5 mol % or less and 88.5 mol % or more.

Preferably, the present invention relates to the biodegradable aliphatic polyester fiber, wherein the polyhydroxyalkanoate has a melt flow rate of 0.1 or more and 100 or less as measured at 160° C. under a load of 5 kg.

The present invention also relates to the biodegradable aliphatic polyester fiber, wherein the fiber is obtained by being extruded from a spinning die at a temperature of 130° C. or more and 190° C. or less, and then being spun at a take-up speed of 2,000 m/min or more and 7,000 m/min or less.

The present invention also relates to the biodegradable aliphatic polyester fiber, wherein the fiber is obtained by being spin drawn from a spinning die at a temperature of 130° C. or more and 190° C. or less, then being taken up by a first take-up roll at a take-up speed of 300 m/min or more and 4,000 m/min or less, and continuously being taken up by a second take-up roll at a take-up speed of 600 m/min or more and 7,000 m/min or less.

In a second aspect, the present invention relates to a nonwoven made of the biodegradable aliphatic polyester fiber mentioned previously, wherein the fiber is obtained by being extruded from a spinning die at a temperature of 130° C. or more and 190° C. or less, and then being drawn pneumatically with a pneumatic ejector.

In a third aspect, the present invention relates to a method for producing the biodegradable aliphatic polyester fiber mentioned previously, wherein the fiber is extruded from a spinning die at a temperature of 130° C. or more and 190° C. or less, and then is spun at a take-up speed of 2,000 m/min or more and 7,000 m/min or less.

The present invention also relates to a method for producing the biodegradable aliphatic polyester fiber mentioned previously, wherein the fiber is spin drawn from a spinning die at a temperature of 130° C. or more and 190° C. or less, then being taken up by a first take-up roll at a take-up speed of 300 m/min or more and 4,000 m/min or less, and continuously being taken up by a second take-up roll at a take-up speed of 600 m/min or more and 7,000 m/min or less.

Moreover, the present invention relates to a method for producing a nonwoven made of the biodegradable aliphatic polyester fiber mentioned previously, wherein the fiber is extruded from a spinning die at a temperature of 130° C. or more and 190° C. or less, and then is drawn pneumatically with a pneumatic ejector.

Advantageous Effects of Invention

The present invention can increase the speed of crystallization of polyhydroxyalkanoate, and can improve the threading of fiber using suction gun, spinnability and productivity of the fiber, and also its tensile strength.

DESCRIPTION OF EMBODIMENTS

In the following, some examples of preferred embodiments of the present invention is explained specifically.

The biodegradable aliphatic polyester fiber of the present invention contains a polyhydroxyalkanoate, a nucleating agent, and a lubricant. The fiber as used herein refers to, for example, an item having a thickness of 0.1 µm or more and 500 µm or less, a length of 1,000 µm or more, and a weight of 1 g or more and 2,000 g or less per a fiber length of 10,000 m. In addition, biodegradability is a nature of being degraded by the action of a microorganism.

[Polyhydroxyalkanoate]

The polyhydroxyalkanoate includes one or more species selected from microorganism-produced PHAs, which are produced from microorganisms.

Common PHAs include PHAs obtainable through chemical synthesis in addition to the microorganism-produced PHAs, which are produced from microorganisms. In the microorganism-produced PHAs, their structural unit (monomer structural unit) is only a D-form (R-form) and therefore they are optically active, whereas in the PHA obtainable through chemical synthesis, structural units (monomer structural units) derived from a D-form (R-form) and an L-form (S-form) are bonded randomly and therefore they are optically inactive.

The microorganism-produced PHAs, are preferably an aliphatic polyester having a repeating unit represented by formula (1): [—CHR—$CH_2$—CO—O—], wherein R is an alkyl group represented by $C_nH_{2n+1}$ and n is an integer of 1 or more and 15 or less.

The microorganisms that produce microorganism-produced PHAs are not particularly limited as long as they have the ability to produce PHAs. For example, *Bacillus megaterium* is the first discovered poly(3-hydroxybutyrate) producing microorganism (hereinafter, poly(3-hydroxybutyrate) is abbreviated as "PHB"), which was discovered in 1925, and as natural microorganisms, *Cupriavidus necator* (formerly classified as *Alcaligenes eutrophus, Ralstonia eutropha*) and *Alcaligenes latus* are also known to be PHB-producing microorganisms. These microorganisms accumulate PHB in their cells.

Further, known microorganisms that produce copolymers of hydroxybutyrate and another hydroxyalkanoate are, for example, *Aeromonas caviae*, which produces poly(3-hydroxybutyrate-co-3-hydroxyvalerate) (hereinafter, abbreviated as "PHBV") and poly(3-hydroxybutyrate-co-3-hydroxyhexanoate) (hereinafter, abbreviated as "P3HB3HH"), and *Alcaligenes eutrophus*, which produces poly(3-hydroxybutyrate-co-4-hydroxybutyrate). Especially, regarding P3HB3HH, microorganism such as *Alcaligenes eutrophus* AC32, FERM BP-6038 (T. Fukui, Y Doi, J. Bateriol., 179, p. 4821-4830 (1997)), is more preferred as a PHA synthesis gene is introduced to improve the production of P3HB3HH. These microorganisms are cultured under proper conditions, and thus P3HB3HH can be accumulated in their cells. Besides the above microorganisms, genetically-modified microorganisms in which various PHA synthesis-related genes are introduced in accordance with the intended type of PHA to be produced and optimized culture conditions including the type of the substrate, may also be used.

The polyhydroxyalkanoate is not particularly limited with respect to its molecular weight as long as it substantially exhibits sufficient physical properties for the intended use. However, if the molecular weight is excessively low, molded products tend to have low strength. On the other hand, if the molecular weight is excessively high, the polyhydroxyalkanoate will show bad processability, and therefore it tends to be difficult to mold. In view of such circumstances, the weight-average molecular weight of the polyhydroxyalkanoate is preferably in the range of 50,000 or more and 3,000,000 or less, and more preferably in the range of 100,000 or more and 1,500,000 or less. It is noted that the weight-average molecular weight is determined from standard polystyrene molecular weight that is measured by using gel permeation chromatography (GPC) using a chloroform. Column used in the GPC may be any column suitable for measuring the molecular weight.

The melt flow rate of the polyhydroxyalkanoate measured at 160° C. under a load of 5 kg is preferably 0.1 or more and 100 or less, and more preferably 1 or more and 50 or less, and even more preferably 10 or more and 40 or less. If the melt flow rate is excessively low, the molten flowability tends to be insufficient, and when the melt flow rate is excessively high, the molten flowability tends to be excessively high. Therefore, it will be difficult to take-up the fibers in both the cases. The melt flow rate can be measured by a method in accordance with JIS K 7210.

Examples of the polyhydroxyalkanoate include PHB [poly(3-hydroxybutyrate), poly(3-hydroxybutyric acid)], P3HB3HH [poly(3-hydroxybutyrate-co-3-hydroxyhexanoate), poly(3-hydroxybutyric acid-co-3-hydroxyhexanoic acid)], PHBV [poly(3-hydroxybutyrate-co-3-hydroxyvalerate), poly(3-hydroxybutyric acid-co-3-hydroxyvaleric acid)], P3HB4HB [poly(3-hydroxybutyrate-co-4-hydroxybutyrate), poly(3-hydroxybutyric acid-co-4-hydroxybutyric acid)], poly(3-hydroxybutyric acid-co-3-hydroxyvaleric acid-co-3-hydroxyhexanoic acid), poly(3-hydroxybutyrate-co-3-hydroxyoctanoate), and poly(3-hydroxybutyrate-co-3-hydroxyoctadecanoate).

Examples of those industrially produce easily include PHB, P3HB3HH, PHBV, poly (3-hydroxybutyric acid-co-3-hydroxyvaleric acid-co-3-hydroxyhexanoic acid), and P3HB4HB. Furthermore, P3HB3HH is preferable because the effect of promoting crystallization due to the addition of the nucleating agent is remarkable.

Regarding the average composition ratio of the repeating unit of the polyhydroxyalkanoate, from the viewpoint of the balance between flexibility and strength of the fibers, the composition ratio of poly(3-hydroxybutyrate) is preferably 80 mol % or more and 99.5 mol % or less, and more preferably 85 mol % or more and 99.5 mol % or less, and even more preferably 85 mol % or more and 97 mol % or less. If the composition ratio of poly(3-hydroxybutyrate) is less than 80 mol %, the rigidity tends to be insufficient, and if the composition ratio is more than 99.5 mol %, the flexibility tends to be insufficient.

The polyhydroxyalkanoate in the present invention, may be of one type or a mix of at least two types of PHAs; for example, a mix of two types of P3HB3HH having different poly(3-hydroxybutyrate) composition ratio can be used.

When P3HB3HH is used as the polyhydroxyalkanoate, regarding the average composition ratio of the repeating unit of the polyhydroxyalkanoate, the percentage of 3-hydroxybutyric acid monomer in poly(3-hydroxybutyric acid-co-3-hydroxyhexanoic acid) is preferably 99.5 mol % or less and 85.0 mol % or more, and more preferably 95 mol % or less and 88.5 mol % or more. If the percentage of 3-hydroxybutyric acid monomer is 99.5 mol % or less and 85.0 mol % or more, the fibers are excellent in flexibility and mechanical strength.

[Nucleating Agent]

The nucleating agent in the present invention contains pentaerythritol. Since pentaerythritol is excellent in improving the crystallization speed of a biodegradable resin and shows good compatibility and affinity with biodegradable resin, the resulting polyester fibers are high in tensile strength and show excellent suction property during their production processes, and thus have excellent spinnability and productivity.

The nucleating agent may be composed of only pentaerythritol or may also contain other nucleating agents than pentaerythritol. Examples of such nucleating agents other than pentaerythritol include: inorganic substances such as boron nitride, titanium oxide, talc, layered silicate, calcium carbonate, sodium chloride, and metal phosphates; sugar alcohol compounds derived from natural products such as erythritol, galactitol, mannitol, and arabitol; polyvinyl alcohol, chitin, chitosan, polyethylene oxide, aliphatic carboxylic amides, aliphatic carboxylic salts, aliphatic alcohols, aliphatic carboxylic esters, dicarboxylic acid derivative such as dimethyl adipate, dibutyl adipate, diisodecyl adipate, and dibutyl sebacate; cyclic compounds having a functional group of C=O and a functional group selected from NH, S, and O in the molecule such as indigo, quinacridone, and quinacridone magenta; sorbitol derivatives such as bisbenzylidene sorbitol and bis(p-methylbenzylidene) sorbitol; compounds having nitrogen-containing heteroaromatic nucleus such as pyridine, triazine, and imidazole; phosphate compounds, bisamides of higher fatty acids and metal salts of higher fatty acids; branched polylactic acid, and low molecular weight poly(3-hydroxybutyric acid). Such nucleating agents other than pentaerythritol may be used alone or in combination of two or more species.

Usually, the pentaerythritol in the present invention is not limited as long as it is commonly available, and may be one provided as a reagent or an industrial product. Examples of the reagent include, those produced by Wako Pure Chemical Industries, Ltd., Sigma-Aldrich, Tokyo Chemical Industries Co., Ltd., Merck and not limited to others. Examples of the industrial product include, one produced by Koei Chemical Co., Ltd., (trade name: Pentarit) and one produced by Toyo Chemicals Co., Ltd. and not limited to others.

Some commercially available reagents and products contain impurities of oligomers generated by dehydration condensation of pentaerythritol, such as dipentaerythritol and tripentaerythritol. These oligomers have no effect on the crystallization of polyhydroxyalkanoate, and do not inhibit the crystallization effect of pentaerythritol. Therefore, pentaerythritol used in the present invention may contain such oligomers.

The content of the nucleating agent (for example, the content of pentaerythritol) is not particularly limited as long as the crystallization of polyhydroxyalkanoate can be promoted. However, the amount of the nucleating agent is preferably 0.05 parts by weight or more and 12 parts by weight or less, and more preferably 0.1 parts by weight or more and 10 parts by weight or less, and even more preferably 0.5 parts by weight or more and 8 parts by weight or less relative to 100 parts by weight of polyhydroxyalkanoate. If the content of the nucleating agent is excessively small, the effect as nucleating agent may not be obtained, and if the content of the nucleating agent is excessively large, the improvement of crystallization speed is deteriorated and some disadvantages may occur, such as, the drop of viscosity during processing or the decrease in physical properties of the fibers.

[Lubricant]

The lubricant in the present invention contains at least one species selected from behenic amide, stearic acid amide, erucamide, and oleic amide. This feature makes fibers to be obtained have lubricity, especially, external lubricity. Behenic amide, stearic acid amide, erucamide, and oleic amide are also advantageous in that they are easily available.

Among behenic amide, stearic acid amide, erucamide, and oleic amide, erucamide is particularly preferable. This is because excellent fiber threading of fibers using suction gun is obtained during the process of producing the biodegradable aliphatic polyester fiber, and the spinnability and the productivity are also excellent.

Moreover, the lubricant may be of behenic amide, stearic acid amide, erucamide, oleic amide, or a combination of two or more of these, and may be of a lubricant other than behenic amide, stearic acid amide, erucamide, and oleic amide. Examples thereof include, alkylene fatty acid amides such as methylenebisstearic acid amide and ethylenebisstearic acid amide; glycerin monofatty acid esters such as polyethylene wax, oxidized polyester wax, glycerin monostearate, glycerin monobehenate, and glycerin monolaurate; organic acid monoglycerides such as succinic acid saturated fatty acid monoglyceride; sorbitan fatty acid esters such as sorbitan behenate, sorbitan stearate, and sorbitan laurate; polyglycerin fatty acid esters such as diglycerin stearate, diglycerin laurate, tetraglycerin stearate, tetraglycerin laurate, decaglycerin stearate, and decaglycerin laurate; and higher alcohol fatty acid esters such as stearyl stearate; and not limited to others. Lubricants other than behenic amide, stearic acid amide, erucamide, and oleic amide may be used alone or in combination of two or more.

The content of the lubricant (for example, the total content of behenic amide, stearic acid amide, erucamide, and oleic amide) is not particularly limited as long as lubricity can be imparted, but it is preferably 0.01 parts by weight or more and 20 parts by weight or less, and more preferably 0.05 parts by weight or more and 10 parts by weight or less, and even more preferably more than 0.5 parts by weight and 10 parts by weight or less, and still even more preferably more than 0.5 parts by weight and 5 parts by weight or less, and most preferably 0.7 parts by weight or more and 4 parts by weight or less relative to 100 parts by weight of the polyhydroxyalkanoate. If the content of the lubricant is excessively small, no effect may be obtained, and if the content of the lubricant is excessively large, the lubricant will emerge to the surface of the fiber and will damage the feeling (texture) of the fiber.

The content of the erucamide is preferably 0.2 to 4 parts by weight, and more preferably 0.5 to 3 parts by weight, and even more preferably 0.8 to 2 parts by weight relative to 100 parts by weight of the polyhydroxyalkanoate. By controlling the content of erucamide within the above range, excellent balance between spinnability and tensile strength is maintained.

[Optional Components]

The biodegradable polyester-based fiber of the present invention may contain other components such as plasticizer, inorganic filler, antioxidant, ultraviolet absorber, colorant such as dye or pigment, or antistatic agent in addition to the polyhydroxyalkanoate, nucleating agent, and lubricant as long as the characteristics of the biodegradable polyester-based fiber are not deteriorated.

The above plasticizer is not particularly limited, and examples thereof include: modified glycerin-based compounds such as glycerin diacetate monolaurate, glycerin diacetate monocaprylate, and glycerin diacetate monodecanoate; adipic acid ester compounds such as diethylhexyl adipate, dioctyl adipate, and diisononyl adipate; polyether ester compounds such as polyethylene glycol dibenzoate, polyethylene glycol dicaprylate, and polyethylene glycol diisostearate; benzoic acid ester compounds; epoxidized soybean oil; epoxidized fatty acid 2-ethylhexyl; and sebacic acid monoesters. These may be used alone or combination of two or more.

Among the above plasticizers, modified glycerin compounds and polyether ester compounds are preferable because they are easy to obtain and show good effect.

Inorganic filler is not particularly limited, and examples thereof include clay, silica, carbon black, barium sulfate, mica, glass fiber, whisker, carbon fiber, magnesium carbonate, glass powder, metal powder, kaolin, graphite, molybdenum disulfide, and zinc oxide. One or two or more of these can be used.

When an inorganic filler is added, the content of the inorganic filler is not particularly limited as long as the effect of the present invention can be obtained, and for example, the content is preferably 0.1 parts by weight or more and 50 parts by weight or less relative to 100 parts by weight of the polyhydroxyalkanoate.

[Production Method]

As a method for obtaining the biodegradable polyester fiber of the present invention, any melt-spinning method that is commonly used can be employed and there are no particular limitations. For example, after melting a composition containing a polyhydroxyalkanoate, a nucleating agent, and a lubricant by using an extruder or anything alike and extruding the composition from a spinning nozzle, it is possible to employ i) high speed melt spinning that includes taking up the composition while drawing it at high-speed on a take-up roll, ii) high-speed in-line spin drawing that includes taking up the composition on a first take-up roll, then drawing it continuously using several take-up rolls (second take-up roll and if necessary third take-up roll) having higher speed or iii) spunbond that includes drawing the composition pneumatically with a pneumatic ejector and then collecting it on a take-up roll or on a belt to obtain a nonwoven.

Any common melt-extruder may be used as long the molecular weight or the melt viscosity of the polyhydroxyalkanoate could be kept at a reasonable value to process where either a compression extruder having a melting section which could be kept at a fixed temperature or a screw type extruder capable of continuous feeding may be used. Compression extruder is suited for a small-scale evaluation of melt-extrusion, whereas screw type extruder is suitable for industrial production. The temperature directly under the spinning nozzle is not particularly limited, but it is preferably at its glass transition temperature or more and 70° C. or less to make the PHA fiber. It is more preferable to make fiber at the glass transition temperature or more and 60° C. or less because it is possible to reduce unnecessary energy consumption or facility.

The melt-spinning temperature of the biodegradable polyester fiber of the present invention is preferably 130° C. or more and 190° C. or less, and more preferably 150° C. or more and 190° C. or less. If the melt-spinning temperature is lower than 130° C., the spinning becomes unstable due to the presence of components which are not completely melted. If the melt-spinning temperature is higher than 190° C., thermal degradation of the resin is prone to occur. Therefore, the spinning becomes unstable, and the physical properties of fibers may deteriorate. The melt-spinning temperature can be expressed in other words, as the temperature of the resin when being extruded from a spinning die.

When a composition containing a polyhydroxyalkanoate, a nucleating agent, and a lubricant is melted and extruded from a spinning die at a certain throughput rate by adjusting the feeding of the composition, and then taken up at a take-up roll, the hole area of the spinning die is preferably 0.03 mm$^2$ or more and 3.5 mm$^2$ or less. If the hole area is smaller than 0.03 mm$^2$, the fiber is prone to break during the spinning, and if the area of the hole exceeds 3.5 mm$^2$, the fiber becomes thick, and therefore, a longer time required for solidification. Thus, the molecular chain of PHA in the extruded fiber may be relaxed, and the processability and the strength of the fiber may not be improved.

Although the residence time can be chosen arbitrarily on the basis of the required fiber diameter and the spinning speed during the production, the residence time of a resin within the extrusion section of the spinning machine is preferably 30 minutes or less, and more preferably 15 minutes or less in order to minimize the effect of polymer degradation due to the heat applied during extrusion.

When producing the biodegradable polyester fiber by i) high speed melt spinning that includes taking up the composition while drawing it at a high-speed take-up roll, the take-up speed is preferably 2,000 m/min or more and 7,000 m/min or less, and more preferably 2,500 m/min or more and 7,000 m/min or less. If the take-up speed is less than 2,000 m/min, for PHA especially P3HB3HH, oriented crystal will not formed sufficiently and self-elongation etc. will occur, thus the fiber production may be unstable and the resulting fibers may be low in physical properties. The take-up speed has no particular upper limit, but it is not required to be set at 7,000 m/min or more because the strength of fibers does not vary at any take-up speed more than 7,000 m/min.

When producing the biodegradable polyester fiber by ii) high-speed in-line spin drawing that includes taking up the composition on a first take-up roll, then drawing it continuously using several take-up rolls (second take-up roll and if necessary third take-up roll) having higher speed, it is preferable to adjust the take-up speed at the first take-up roll to 300 m/min or more and 4,000 m/min or less, and the take-up speed at the second take-up roll to 600 m/min or more and 7,000 m/min or less where the take-up speed at the first take-up roll being slower than the take-up speed at the second take-up roll. If the take-up speed at the second take-up roll is excessively slow, self-elongation, etc. will occur and thus the fiber production may be unstable and the resulting fibers may be low in physical properties. The take-up speed has no particular upper limit, but it is not required to be set at 7,000 m/min or more because the strength of fibers does not vary at any take-up speed of more than 7,000 m/min.

It is also possible to process the biodegradable polyester fiber into a nonwoven by, for example, iii) spunbond that includes drawing the composition pneumatically with a pneumatic ejector and then collecting it on a take-up roll or on a belt to obtain a nonwoven. As a method for processing a nonwoven, common methods can be employed, and examples thereof include spunbond, meltblow, and air-laid.

When producing a nonwoven by spunbond, the pneumatically drawing speed with a pneumatic ejector is preferably 700 m/min or more and 7,000 m/min or less, and more preferably 800 m/min or more and 7,000 m/min or less. When the pneumatically drawing speed is less than 700 m/min, the nonwoven may shrink during cooling and a favorable nonwoven with uniform quality may not be obtained. The pneumatically drawing speed has no particular upper limit, but it is not required to be set at 7,000 m/min or more because the strength of fibers does not vary at any take-up speed of more than 7,000 m/min. The pneumatically drawing speed is the speed when the fiber passes through the pneumatic ejector.

The biodegradable polyester fiber of the present invention can take various forms, such as thread and nonwoven, and conventional known fibers. It can be used suitably in agriculture, fishery, forestry, clothing, non-clothing fiber products (such as curtains, carpets, and bags), sanitary products, horticulture, automobile, building materials, medical care, food industry, and other fields.

EXAMPLES

Hereinafter, the present invention will be described specifically with reference to examples, but the technical scope of the present invention is not limited by these examples.

<Production Example 1> Production of P3HB3HH

KNK-005 strain (see U.S. Pat. No. 7,384,766) was used for culture production.

The composition of the seed medium (pH 6.8) was: 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$.

The composition of the preculture medium was: 1.1 w/v % $Na_2HPO_4.12H_2O$, 0.19 w/v % $KH_2PO_4$, 1.29 w/v % $(NH_4)_2SO_4$, 0.1 w/v % $MgSO_4.7H_2O$, and 0.5 v/v % trace metal salt solution (obtained by dissolving 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$ in 0.1 N hydrochloric acid). As a carbon source, palm oil was added all at once at a concentration of 10 g/L.

The composition of the P3HB3HH production medium was: 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$, 0.5 v/v % trace metal salt solution (obtained by dissolving 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$ in 0.1 N hydrochloric acid), and 0.05 w/v % BIOSPUREX200K (defoaming agent: produced by Cognis Japan Ltd.).

First, a glycerol stock (50 μl) of KNK-005 strain was inoculated into the seed medium (10 ml) and seed-cultured for 24 hours. Then, the resulting seed culture liquid was inoculated at 1.0 v/v % into a 3-L jar fermenter (MDL-300 produced by B. E. MARUBISHI Co., Ltd.) containing 1.8 L of the preculture medium. Preculture was performed for 28 hours under operation conditions where the culture temperature was 33° C., the stirring speed was 500 rpm, and the ventilation volume was 1.8 L/min while pH was controlled to be in the range of 6.7 to 6.8. For the pH control, a 14% aqueous ammonium hydroxide solution was used.

Then, the resulting preculture liquid was inoculated at 1.0 v/v % into a 10-L jar fermenter (MDS-1000 manufactured by B. E. MARUBISHI Co., Ltd.) containing 6 L of the production medium. The operation conditions include: a culture temperature of 28° C., a stirring speed of 400 rpm, and a ventilation volume of 6.0 L/min, and pH was controlled within the range of 6.7 to 6.8. For the pH control, a 14% aqueous ammonium hydroxide solution was used. Palm oil was used as the carbon source. The culture was performed for 64 hours. After the completion of the culture, cells were collected by centrifugal separation, washed with methanol, and freeze dried to measure the weight of the dried cells.

One hundred milliliters of chloroform was added to 1 g of the obtained dried cells, and the mixture was stirred at room temperature all day and night to extract P3HB3HH in the cells. The mixture was filtered to remove cell residue, and the resulting filtrate was concentrated by an evaporator until its total volume became 30 ml. Then, 90 ml of hexane was gradually added to the filtrate, and the resulting mixture was allowed to stand for 1 hour while being gently stirred. The precipitated P3HB3HH was collected by filtration and then vacuum-dried at 50° C. for 3 hours, and thus, P3HB3HH which was polyhydroxyalkanoate A1 was obtained.

The 3HB and 3HH contents of the obtained P3HB3HH were measured by gas chromatography in the following manner. Two milliliters of a sulfuric acid/methanol mixed solution (15:85) and 2 ml of chloroform were added to 20 mg of the dried P3HB3HH, and the mixture was sealed tightly and heated at 100° C. for 140 minutes, thereby obtaining a P3HB3HH degradation product, which was a methyl ester. After cooling, 1.5 g of sodium hydrogen carbonate was added thereto little by little for neutralization, and the resulting mixture was allowed to stand until generation of carbon dioxide gas stopped. Following addition of 4 ml of diisopropyl ether, the mixture was well mixed and then centrifuged. Then, the monomer unit composition of the polyester degradation product in a supernatant was analyzed by capillary gas chromatography. The gas chromatograph and the capillary column used were "GC-17A" manufactured by Shimadzu Corporation and "NEUTRA BOND-1" manufactured by GL Sciences Inc. (column length: 25 m, column inner diameter: 0.25 mm, liquid membrane thickness: 0.4 μm), respectively. Helium gas was used as the carrier gas, the column inlet pressure was 100 kPa, and 1 μl of a sample was injected. As for temperature conditions, the temperature was increased from an initial temperature of 100° C. to 200° C. at a rate of 8° C./min, and was further increased from 200° C. to 290° C. at a rate of 30° C./min. The result of the analysis under the above conditions, the polyhydroxyalkanoate A1 was a P3HB3HH having a monomer percentage of the 3-hydroxyhexanoate (3HH) of 5.4 mol % and a monomer percentage of the 3-hydroxybutyrate (3HB) of 94.6 mol %. The weight-average molecular weight Mw measured by GPC was 350,000 and the melting point was 141° C.

Production Example 2

P3HB3HH which is polyhydroxyalkanoate A2 was obtained in the same manner as in Production Example 1 except that KNK-631 stain (see WO 2009/145164) and palm kernel oil as a carbon source were used. Polyhydroxyalkanoate A2 was a P3HB3HH having a monomer percentage of 3-hydroxyhexanoate (3HH) of 11.4 mol % and a monomer percentage of 3-hydroxybutyrate (3HB) of 88.6 mol %. The weight-average molecular weight Mw measured by GPC was 330,000 and the melting point was 131° C.

Compounding Examples 1 to 12

The P3HB3HH (100 parts by weight) obtained in Production Example 1 or 2 and other components were dry-blended in composition ratios shown in Table 1, melt-kneaded at 130 to 160° C. using a twin screw extruder (TEM26SS) manufactured by Toshiba Machine Co., Ltd., and then pelletized.

TABLE 1

|  |  | Compounding Example 1 | Compounding Example 2 | Compounding Example 3 | Compounding Example 4 | Compounding Example 5 | Compounding Example 6 |
|---|---|---|---|---|---|---|---|
| Polyhydroxyalkanoate | A1 | 100 | 100 | 100 | 100 | 80 | 100 |
|  | A2 | 0 | 0 | 0 | 0 | 20 | 0 |

TABLE 1-continued

| | | | | | | | |
|---|---|---|---|---|---|---|---|
| Nucleating agent | Pentaerythritol | 1 | 1 | 1.5 | 1 | 1.5 | 0 |
| | Galactitol | 0 | 0 | 0 | 0 | 0 | 0 |
| | Titanium oxide | 0 | 0 | 0 | 0.5 | 0 | 0 |
| Lubricant | Erucamide | 0.5 | 1 | 1 | 1 | 1 | 0 |
| | Behenic amide | 0.5 | 0.5 | 0.5 | 0.5 | 0.5 | 0.5 |
| | Polyethylene wax | 0 | 0 | 0 | 0 | 0 | 0 |

| | | Compounding Example 7 | Compounding Example 8 | Compounding Example 9 | Compounding Example 10 | Compounding Example 11 | Compounding Example 12 |
|---|---|---|---|---|---|---|---|
| Polyhydroxyalkanoate | A1 | 100 | 100 | 100 | 100 | 100 | 100 |
| | A2 | 0 | 0 | 0 | 0 | 0 | 0 |
| Nucleating agent | Pentaerythritol | 0 | 1.5 | 1.5 | 1.5 | 0 | 1.5 |
| | Galactitol | 0 | 0 | 0 | 0 | 1.5 | 0 |
| | Titanium oxide | 0 | 0 | 0 | 0 | 0 | 0 |
| Lubricant | Erucamide | 0.5 | 1.5 | 0 | 0 | 1 | 0 |
| | Behenic amide | 0.5 | 0 | 1.5 | 0 | 0.5 | 0 |
| | Polyethylene wax | 0 | 0 | 0 | 1.5 | 0 | 0 |

Examples 1 to 12, Comparative Examples 1 to 7

The pellet obtained with each of the composition ratio shown in Compounding Examples 1 to 12 was melted using a single screw extruder having a screw diameter of 20 mm. The through-put was adjusted by a gear pump. The pellet was extruded from a spinning die having a melt-spinning temperature of 160° C. to an atmosphere having an ambient temperature at 25° C. at 2.5 g/min/hole that is the throughput rate of resin per hole. The spinning die had four spinning holes, and the area of each spinning hole was 0.2 mm$^2$. The fiber was taken up at a take-up speed shown in Table 2 for each examples and comparative examples and polyester fibers were obtained at a winder at 25° C. The residence time of the resin in the spinning machine was 14 minutes. Table 2 shows the production conditions including the pellets from compounding examples and the take-up speed.

The respective polyester fibers obtained were evaluated as follows. The results are shown in Table 2.

(Suction Property)

Regarding the suction property, during the production of each of the polyester filer of the examples and the comparative examples, a state where yarns were discharged through the four spinning holes of the die and then were taken up with a suction gun in order to wind the yarns around the take-up roll was evaluated visually.

very good: Fibers do not adhere to the suction gun and the fibers can be taken up.

good: Some fibers adhere to the suction gun in an initial stage, but when the taking up has been stabilized, fibers do not adhere and can be taken up.

not so good: Fibers can be taken up in an initial stage, but the fibers adhere to the suction gun or break in 10 seconds.

poor: Fibers adhere to the suction gun and/or break.

(Tensile Strength)

The tensile strength of the fibers obtained was measured under the following conditions using a tensile tester "Autograph AG-I" manufactured by Shimadzu Corporation. Polyester fibers obtained in the examples and the comparative examples are cut into an initial length of 20 mm, and the tensile strength was measured at a tensile speed of 20 mm/min using a load cell of 5 N.

TABLE 2

| | | Example 1 | Example 2 | Example 3 | Example 4 | Example 5 | Example 6 | Example 7 |
|---|---|---|---|---|---|---|---|---|
| Compounding Example | — | 1 | 2 | 3 | 4 | 5 | 1 | 2 |
| Take-up speed | m/min | 2000 | 2000 | 2000 | 2000 | 2000 | 4000 | 4000 |
| Suction property | — | good | very good | very good | very good | very good | good | very good |
| Tensile strength | MPa | 105 | 99 | 98 | 96 | 93 | 114 | 100 |

| | | Example 8 | Example 9 | Example 10 | Example 11 | Example 12 | Comparative example 1 | Comparative example 2 |
|---|---|---|---|---|---|---|---|---|
| Compounding Example | — | 3 | 4 | 5 | 8 | 9 | 6 | 6 |
| Take-up speed | m/min | 4000 | 4000 | 4000 | 4000 | 4000 | 2000 | 4000 |
| Suction property | — | very good | very good | very good | very good | good | not so good | poor |
| Tensile strength | MPa | 116 | 93 | 99 | 99 | 97 | 45 | 70 |

| | | Comparative example 3 | Comparative example 4 | Comparative example 5 | Comparative example 6 | Comparative example 7 |
|---|---|---|---|---|---|---|
| Compounding Example | — | 7 | 7 | 10 | 11 | 12 |
| Take-up speed | m/min | 2000 | 4000 | 2000 | 2000 | 4000 |
| Suction property | — | poor | poor | poor | good | not so good |
| Tensile strength | MPa | 60 | 80 | Unspinnable | 30 | 80 |

Examples 13 to 19, Comparative Examples 8 to 11

The pellet obtained in each of the compounding examples was melted by a single screw extruder having a screw diameter of 20 mm. The through-put was adjusted by a gear pump. The pellet was extruded from a spinning die having a melt-spinning temperature of 160° C. to an atmosphere having an ambient temperature of 25° C. at 3.3 g/min/hole which is the throughput rate of resin per hole. The spinning die had three spinning holes, and the area of each spinning hole was 0.2 mm². The fiber was taken up by a first take-up roll having a temperature of 50° C. at a take-up speed shown in Table 3 for each of the examples and the comparative examples (first roll take-up speed), and then continuously taken up by a second take-up roll at 50° C. at a take-up speed shown in Table 3 (second take-up speed) where the polyester fiber was obtained. The residence time of the resin in the spinning machine was 14 minutes. Table 3 shows the production conditions including the pellets from compounding examples and the take-up speed.

Example 20, Comparative Examples 12, 13

The pellet obtained in each of the compounding examples was melted by a single screw extruder having a screw diameter of 20 mm. The throughput was adjusted by a gear pump. The pellet was extruded from a spinning die having a melt-spinning temperature of 160° C. to an atmosphere having an ambient temperature at 25° C. at 2.5 g/min/hole which is the throughput of resin per hole. The spinning die had four spinning holes, and the area of each spinning hole was 0.2 mm². The fiber was drawn pneumatically with a pneumatic ejector having a diameter of 0.8 mm and blown to a wire mesh having a plain rectangular weave pattern, and then the wire mesh was manually moved to obtain a non-woven. Table 4 shows the production conditions including the pellets from compounding examples and the pneumatically drawing speed.

TABLE 3

|  |  | Example 13 | Example 14 | Example 15 | Example 16 | Example 17 | Example 18 |
|---|---|---|---|---|---|---|---|
| Compounding Example | — | 3 | 3 | 3 | 3 | 3 | 8 |
| First roll take-up speed | m/min | 600 | 600 | 1000 | 1200 | 2000 | 600 |
| Second roll take-up speed | m/min | 1800 | 3000 | 3000 | 3600 | 4000 | 1800 |
| Draw ratio | times | 3 | 5 | 3 | 3 | 2 | 3 |
| Spinnability | — | very good | very good | very good | very good | very good | very good |
| Tensile strength | MPa | 89 | 150 | 80 | 79 | 109 | 80 |

|  |  | Example 19 | Comparative example 8 | Comparative example 9 | Comparative example 10 | Comparative example 11 |
|---|---|---|---|---|---|---|
| Compounding Example | — | 9 | 6 | 10 | 11 | 11 |
| First roll take-up speed | m/min | 600 | 600 | 600 | 600 | 600 |
| Second roll take-up speed | m/min | 1800 | 1200 | 1200 | 1800 | 1800 |
| Draw ratio | times | 3 | 2 | 2 | 3 | 3 |
| Spinnability | — | good | poor | poor | not so good | poor |
| Tensile strength | MPa | 83 | Unmeasurable due to unavailability | Unmeasurable due to unavailability | 70 | Unmeasurable due to unavailability |

The polyester fibers obtained were evaluated as follows. The results are shown in Table 3.

(Draw Ratio)
A draw ratio is calculated from the following equation:

draw ratio=(take-up speed of the second take-up roll)/(take-up speed of the first take-up roll).

(Spinnability)
Regarding the spinnability, during the production of the polyester fiber of each of the examples and the comparative examples, the state of the polyester fiber during the spinning was visually evaluated.
very good: Fibers do not adhere to the roll, do not stick to one another, and can be separated one by one.
good: Fibers do not adhere to the roll, but they partially stick to one another and can be separated one by one if they are disassemble.
not so good: Fibers do not adhere to the roll, but they partially stick to one another and the stuck part cannot be separated.
poor: Fibers cannot be obtained because they adhere to the roll and/or cannot be taken up.

(Tensile Strength)
The tensile strength of the fibers obtained was measured under the following conditions using a tensile tester "Autograph AG-I" manufactured by Shimadzu Corporation. Polyester fibers obtained in the examples and the comparative examples are cut into an initial length of 20 mm, and the tensile strength was measured at a tensile speed of 20 mm/min using a load cell of 5 N. The results are shown in Table 3.

(Moldability)
The appearance of the nonwovens obtained was observed and their moldability was visually evaluated. The results are shown in Table 4.
good: Fibers spread on the wire mesh uniformly and are bonded to each other, and no shrinkage is observed.
not so good: Fibers spread on a wire mesh uniformly, but they shrink as cooling.
poor: Fibers do not spread on a wire mesh uniformly, and they shrink and become lump as cooling.

TABLE 4

|  |  | Example 20 | Comparative example 12 | Comparative example 13 |
|---|---|---|---|---|
| Compounding Example | — | 3 | 3 | 7 |
| Pneumatically drawing speed | m/min | 3000 | 600 | 3000 |
| Moldability | — | good | poor | poor |

As is apparent from Tables 2 to 4, the biodegradable polyester fiber of the present invention is favorable in spinnability and productivity and exhibits high tensile strength.

The invention claimed is:
1. A method for producing a biodegradable aliphatic polyester fiber, comprising:

spin-drawing a fiber from a spinning die at a temperature of from 130° C. to 190° C.; and subsequently taking up the fiber by a first take-up roll at a take-up speed of from 300 m/min to 4,000 m/min, and continuously taking up by a second take-up roll at a take-up speed of from 600 m/min to 7,000 m/min, wherein the fiber comprises a polyhydroxyalkanoate, a nucleating agent, and a lubricant, the nucleating agent comprises pentaerythritol, and the lubricant comprises at least one selected from the group consisting of behenic amide, stearic acid amide, erucamide, and oleic amide.

2. The method of claim 1, wherein a content of the nucleating agent in the fiber is from 0.05 parts by weight to 12 parts by weight relative to 100 parts by weight of the polyhydroxyalkanoate.

3. The method of claim 1, wherein a content of the lubricant in the fiber is more than 0.5 parts by weight to 10 parts by weight relative to 100 parts by weight of the polyhydroxyalkanoate.

4. The method of claim 1, wherein the lubricant is erucamide.

5. The method of claim 1, wherein the polyhydroxyalkanoate comprises a repeating unit of the formula (1):

[—CHR—CH$_2$—CO—O—]     (1), wherein R is an alkyl group represented by $C_nH_{2n+1}$ and n is an integer of 1 or more and 15 or less.

6. The method of claim 1, wherein the polyhydroxyalkanoate is at least one selected from the group consisting of poly(3-hydroxybutyric acid), poly(3-hydroxybutyric acid-co-3-hydroxyvaleric acid), poly(3-hydroxybutyric acid-co-3-hydroxyvaleric acid-co-3-hydroxyhexanoic acid), poly(3-hydroxybutyric acid-co-3-hydroxyhexanoic acid), and poly(3-hydroxybutyric acid-co-4-hydroxybutyric acid).

7. The method of claim 1, wherein the polyhydroxyalkanoate is poly(3-hydroxybutyric acid-co-3-hydroxyhexanoic acid).

8. The method of claim 7, wherein a monomer percentage of 3-hydroxybutyric acid in the poly(3-hydroxybutyric acid-co-3-hydroxyhexanoic acid) is from 99.5 mol % to 85.0 mol %.

9. The method of claim 1, wherein the polyhydroxyalkanoate has a melt flow rate of from 0.1 to 100 as measured at 160° C. under a load of 5 kg.

10. The method of claim 1, wherein a hole area of the spinning die is from 0.03 mm$^2$ to 3.5 mm$^2$.

11. A biodegradable aliphatic polyester fiber, comprising:

a polyhydroxyalkanoate;

a nucleating agent comprising pentaerythritol; and a lubricant comprising at least one selected form the group consisting of behenic amide, stearic acid amide, erucamide, and oleic amide, wherein the biodegradable aliphatic polyester fiber is obtained by being spin drawn from a spinning die at a temperature of from 130° C. to 190° C., then being taken up by a first take-up roll at a take-up speed of from 300 m/min to 4,000 m/min, and continuously being taken up by a second take-up roll at a take-up speed of from 600 m/min to 7,000 m/min.

12. The method of claim 1, wherein the take-up speed at the first take-up roll is from 600 m/min to 2,000 m/min, and the take-up speed at the second take-up roll is from 1,800 m/min to 4,000 m/min.

* * * * *